(12) United States Patent
Einola et al.

(10) Patent No.: US 7,802,595 B2
(45) Date of Patent: Sep. 28, 2010

(54) METHOD FOR CONTROLLING A POWER SOURCE OF A FORESTRY MACHINE

(75) Inventors: Kalle Einola, Tampere (FI); Veikko Rintamäki, Seinäjoki (FI)

(73) Assignee: Ponsse Oyj, Vieremä (FI)

( * ) Notice: Subject to any disclaimer, the term of this patent is extended or adjusted under 35 U.S.C. 154(b) by 180 days.

(21) Appl. No.: 12/095,746

(22) PCT Filed: Nov. 28, 2006

(86) PCT No.: PCT/FI2006/050525

§ 371 (c)(1),
(2), (4) Date: Jun. 2, 2008

(87) PCT Pub. No.: WO2007/063185

PCT Pub. Date: Jun. 7, 2007

(65) Prior Publication Data

US 2008/0302446 A1    Dec. 11, 2008

(30) Foreign Application Priority Data

Dec. 2, 2005    (FI) ................................. 20051247

(51) Int. Cl.
*B23Q 15/00*    (2006.01)
(52) U.S. Cl. ....................................... 144/356; 144/382
(58) Field of Classification Search ................. 144/356, 144/382, 4.1, 34.1, 392, 394, 2, 404, 357; 91/418, 446, 471
See application file for complete search history.

(56) References Cited

U.S. PATENT DOCUMENTS

| 4,738,104 | A | 4/1988 | Hahmann et al. |
| 5,046,924 | A | 9/1991 | Jurgen et al. |
| 6,986,368 | B2 * | 1/2006 | Brown ......................... 144/4.1 |
| 7,017,460 | B2 * | 3/2006 | Virvalo et al. .................. 83/13 |
| 7,451,790 | B2 * | 11/2008 | Vallebrant et al. ............ 144/4.1 |

FOREIGN PATENT DOCUMENTS

| FI | 82294 B | 7/1986 |
| FI | 111183 B | 6/2003 |
| WO | 86/02975 | 5/1986 |

OTHER PUBLICATIONS

Finnish Office Action and Summary of Finnish Office Action corresponding to FI 82294 B filed Jul. 2, 1986.

* cited by examiner

*Primary Examiner*—Shelley Self
(74) *Attorney, Agent, or Firm*—Young & Thompson

(57) ABSTRACT

A method for controlling a power source (1, 10) of a forestry machine, wherein the power source utilizes directly or indirectly one or more work devices and/or handling devices (3, 4, 7, 8) positioned in the forestry machine and is controlled by a control unit (2). When the control unit in the forestry machine gives one or more work or handling devices a control command starting a change operation, it is transmitted substantially simultaneously to the power source. When arriving at the power source, one or more control commands requiring a power change of the power source affect control parameters of the power source, predicting the future load of the power source.

11 Claims, 2 Drawing Sheets

METHOD FOR CONTROLLING A POWER SOURCE OF A FORESTRY MACHINE

BACKGROUND OF THE INVENTION

The present invention relates to a method for controlling a power source of a forestry machine.

Various forestry machines, such as forwarders and harvesters, are known for carrying out mechanized harvesting. A forestry machine typically comprises a base provided with wheels or rolls and capable of moving on the ground. The base is provided with a cabin and work devices required for each particular case. Such a work device consists of, for example, a boom system, such as a crane or a loader. The end of the boom system is provided with a handling device supported by the boom system in each particular case, with which handling operations are performed for the timber harvested from a forest.

Various harvester heads are moved and used at the end of a boom system in a felling machine, i.e. a harvester, which harvester heads are capable of handling tree trunks in a versatile manner. A harvester head is used for at least felling, delimbing, measuring and cutting the trunk to be handled in a desired manner. On the other hand, various handling devices for performing energy wood harvesting and clearing, such as fuel wood grabs, are known which do not necessarily comprise means required for delimbing or feeding, for instance.

Most of the functions of trunk handling in forestry machines are nowadays hydraulically implemented. For example sawing, feeding, and moving delimbing knives and feed rollers to the open and closed position are examples of individual harvester head functions. Typical boom system functions, in turn, include lifting, bending and turning a boom system, and guiding a telescopic extension in the boom system in and out.

A forwarder is a forestry machine specifically intended for short-distance haul of timber, capable of collecting and transporting the pieces of trunk handled by a harvester, for instance, in their load space to the border of the cutting area for onward transport.

Also what are called dual or combi machines are known that are capable of performing tasks of both a harvester and a forwarder.

In the above-mentioned forestry machines, the primary power source has conventionally been a diesel engine, with which most of the mechanical, electric or pressure medium transmitted power is provided. Such a primary power source, in turn, typically utilizes one or more hydraulic pumps to pressurize the pressure medium. From this primary power source, power and performance can be transmitted also in ways other than hydraulically, for example for the requirements of a traction transmission of a forestry machine or for the need of the work and handling devices in it.

The control of a diesel engine constituting the primary power source in forestry machines has conventionally been implemented in a very simple manner. The control of the power source thus aims at a substantially constant rotative speed, whereby its operation is usually controlled by means of for example a control device, i.e. a controller, in connection with the diesel engine.

However, not even in most cases has it been possible with the control of the power source to avoid situations where the performance of the power source has momentarily been too small. Such a situation typically causes a dip in the rotative speed of the power source, which easily slows down successful implementation of the function to be carried out, or makes it more difficult. Particularly saw cut operations of the trunk after felling a tree are of such a nature that the slowing down of the function may result in significant losses in the form of cutting flaws on the trunks. Modern diesel engines enable, however, a very versatile and quickly reacting control of a power source. The output magnitudes of the engine, such as rotative speed, torque and power production capacity or availability, can be affected significantly by such control.

Thus, solutions are also known where the primary power source of a forestry machine is controlled more actively than before. One solution of this kind is presented in patent publication FI 111183. This publication discloses a forestry machine in which the wood to be handled in it is assessed in an automated and anticipatory manner trunk-specifically. The purpose of the assessment is to achieve continuous information on the power level required by one or more wood handling steps in such a way that the operation of the primary power source of a forestry machine could be automatically optimized trunk-specifically by affecting control parameters of the power source to achieve as optimal efficiency as possible.

On the other hand, it is known that along with the latest engine technology and restricted emission regulations, for instance the capability of diesel engines to respond to an increase in a great and rapid stepwise load has even deteriorated compared to earlier engine technology provided with a mechanical injection pump and injection control. Presently, diesel engines used in forestry machines are usually turbocharged engines provided with an electrically controlled injection system, the power and torque of which are, to a great extent, based on turbo charging. In other words, the amount of fuel injected to an engine only lightly loaded is small, and also the boost pressure is low. When the engine is then unexpectedly loaded, the power production capacity of the engine does not necessarily correspond immediately to the nominal power of the engine, according to which the power source to a power device is usually rated.

It has been observed, however, that the power demand of the forestry machine functions is not always dependable on the trunk-specific properties of the wood under handling but on the forestry machine functions and their implementation as such. This is partly due to the low efficiency of the hydrostatic power transmission used in a forestry machine. Particularly, this is the case when the trees to be handled are small in size.

BRIEF DESCRIPTION OF THE INVENTION

An object of the present invention is thus to provide such a method that a completely new kind of solution could be found for problems caused by the above-mentioned drawbacks of the prior art.

This object is achieved in such a way that the method for controlling a power source of a forestry machine has the characteristic features defined below. Particularly, the present problems are solvable by combining the characteristic features set forth below.

The basic idea of the invention is that the control of a power source of a forestry machine can be connected in a simple manner to one or some control commands of one or more functions consuming a significant amount of power, or to another signal to be processed in the control system of the forestry machine, achieving thus an immediate control command in the power source to maintain the power level sufficient in each particular case or to raise the power level to a required, higher level.

Significant advantages are achieved with the invention. Thus, the solution enables better performance for a forestry machine in practical work, as well as better fuel economy and possibly fewer exhaust gas and noise emissions or other corresponding emissions.

The solution also allows for example the torque, performance or rotative speed generated by the power source to be changed even before the forestry machine function starting or changing in each particular case begins to require power greater than the conventional power production availability of the power source. In this way, a disadvantageous momentary decrease, i.e. a dip, in the rotative speed of the power source has been successfully avoided. On the other hand, a decrease in the power demand of the functions in use in the forestry machine may as well require controlling of the power source, which can be implemented with the present method.

On the other hand, the solution allows quick decision-making on the use of a momentarily raised power level of the power source, for instance in connection with the activation of the trunk feeding or sawing function, whereby the fuel consumption and for instance exhaust gas emissions are minimized. The advantages of such a solution become apparent particularly in the case of a hydraulic system using a harvester head of a harvester, whereby there are great variations in momentary power demands, particularly when the feeding and sawing functions alternate in trunk handling.

Typically, the effect of the power source on control parameters according to the invention is very short, and it is not even necessarily recognizable outwards for instance as an increase in the speed of rotation of the engine, a changing running sound or another disturbing function. On the other hand, it may be noticed as the lack of a dip in the rotative speed of the engine, such a dip having occurred earlier, or as the avoidance of a dip for example at the starting moment of the feed. Naturally, also the function during which the control parameters of the engine are affected can typically be carried out more efficiently and productively than before.

The solution according to the invention can also preferably be applied to other purposes than for controlling the primary power source of a forestry machine.

Further, the solution according to the invention is very simple to implement and does not require other changes for the control system of a modern forestry machine than new software, or rather a small part of it. Therefore, it is easily installable in most forestry machines, as well in connection with the assembly of a new machine as by updating the software of an old machine, if required.

Neither the manufacturing costs nor the usual work manners and routines are affected by the implementation and utilizing of the method in a forestry machine. With regard to the operating costs, in turn, savings are to be expected because the power levels produced by the power source can be optimized better than before to suit each particular work situation.

Further, the use of the solution according to the invention does not load the driver or user of the forestry machine, whose work is already now demanding and includes a lot of observation and decisions, but it is capable of operating automatically on the basis of the information received from the control system of the forestry machine. Thus, the driver or user is able to concentrate on leaving the best possible trace of the work on the stand marked for cutting, as regards both the harvested and remaining trees.

Other advantages of the invention are presented in the following, when particular embodiments of the invention are described in greater detail.

BRIEF DESCRIPTION OF THE FIGURES

In the following, some preferred embodiments of the invention are explained in more detail, referring to the attached drawing, in which.

DETAILED DESCRIPTION OF PREFERRED EMBODIMENTS

Figure 1:
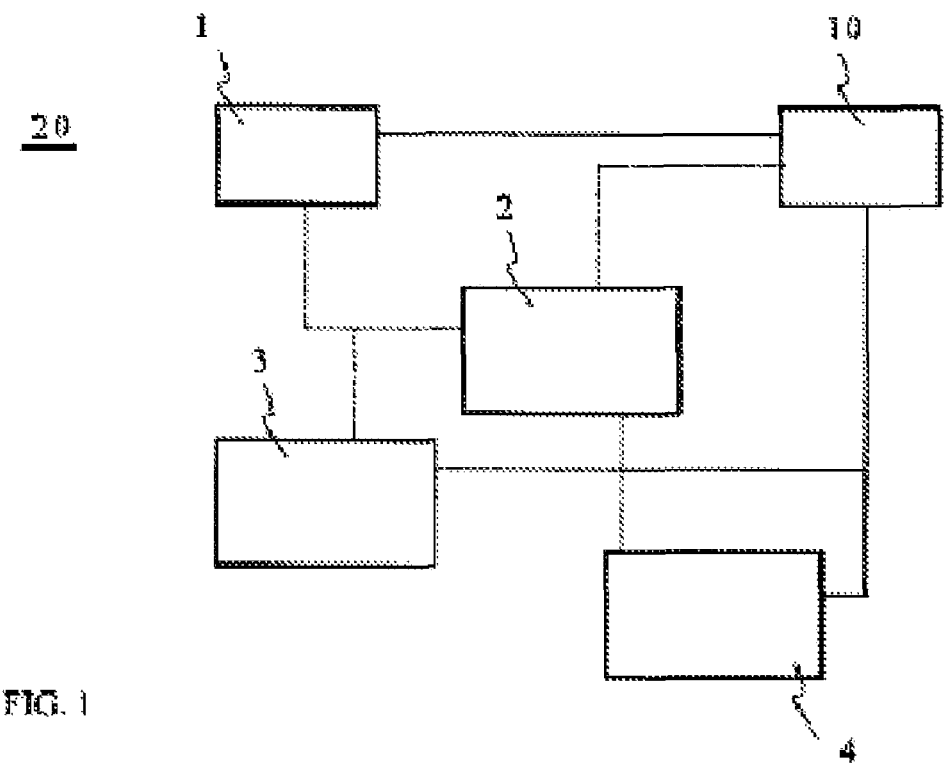
FIG. 1 shows a schematic illustration of the implementation of the method according to the invention.

Some preferred embodiments of the present control method of a power source of a forestry machine are described in the following by referring to the above-mentioned figures. Thus, parts used for implementing the method are indicated in the figures with reference numerals that correspond to the reference numerals in this description.

FIG. 1 thus shows a diagram in which a power source 1 of a forestry machine 20 utilizes directly or indirectly one or more work and/or handling devices controlled by a control means 2 and denoted with reference numerals 3 and 4. The control means gives, in a conventional manner, a control command to one or more work devices or handling devices, which control command starts, for instance, the desired operation in the forestry machine. The control command of the control means given to one or more work devices and/or handling devices is, however, transmitted substantially simultaneously to the power source of the forestry machine as well, conventionally to the control unit controlling it, for example to an electronic control unit (ecu). Thus, there is time to predict the power or torque request presented to the power source by the work device and/or handling device function started by the control command in the required control parameters to be transmitted to the power source. The work device consists of, for example, a boom system 30, such as a crane or a loader.

The control parameters of the power source 1 can also be affected by taking into account the power or torque request presented to the power source by several simultaneous functions of a work and/or handling device. When the requests exceed a preset limit value, the effect on control parameters according to the invention is started. On the other hand, solutions are known where the operation of the power source is actively monitored for this purpose with a means arranged on it. When the means gives information on the load of the power source, a change in the control parameters directed at the power source by the method is arrangeable to be started only when the load level of the power source exceeds a preset limit value. Also the duration of a power change to be provided for the power source can be adjusted separately.

A control command provides for the power source 1 a momentary change in the productivity of the previous power or, for instance, torque. Thus, there is time to raise for example the power production of the power source even before the function of the work and/or handling device 3 and 4 in question begins to require of the power source of the forestry machine power that is greater than the usual power production availability. In practice, this control may manifest itself for instance as an increase in the injection amount of fuel for a short time just before the expected power demand higher than usual occurs. In this way, for example in diesel engines the speeding up and sufficiency of the increase in the boost pressure of a supercharged engine can be ensured, guaranteeing the power or torque level of the power source in each particular case.

Figure 2:
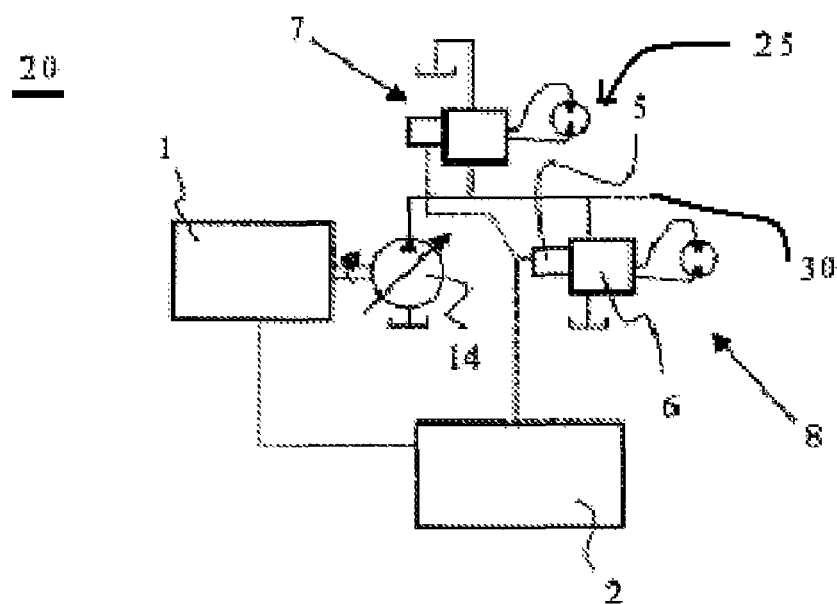
FIG. 2 shows a preferred embodiment of the invention.
Figure 3:
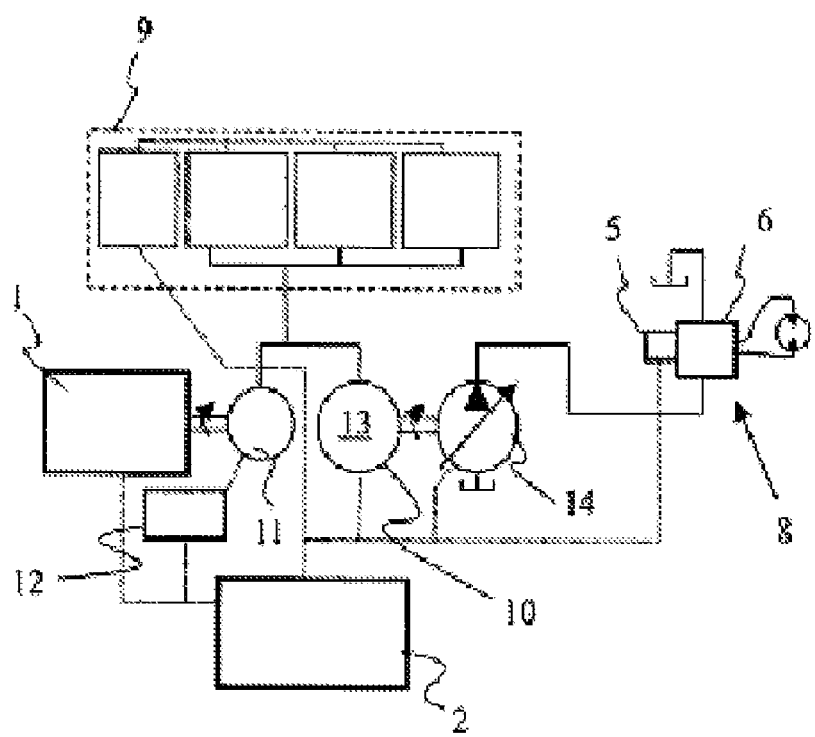
FIG. 3 shows a second preferred embodiment of the invention, also including a non-primary power source.

Typically there will be, after the arrival of the control command, some dozens or hundreds of milliseconds for the power source 1 of the forestry machine to prepare for the increasing power demand that the power source is subjected to. This is possible because the delays of an electronically controlled hydraulic system, for example, can be utilized in the control. Such delays are generated for instance in hydraulically precontrolled control valves used in forestry machines. FIGS. 2 and 3 show such precontrol and control valves 5 and 6. Further, if required, a given delay can be deliberately added to a given activated function to enable better predictability, to the extent to which this can be done without the usability of the forestry machine suffering. Preferably, such a delay can be implemented by software in a control means, for instance. The control parameter of the power source to be affected may be, for example, the power source's rotative speed, injection advance of fuel mentioned above, torque of the power source or any other control parameter controllable with known means.

The present method is particularly useful when applying it to be used in connection with the start of the trunk feeding or sawing function, shown schematically in FIG. 2, to momentarily raise the power level of the power source 1. In this way, the fuel consumption and exhaust gas emissions of a diesel engine, for example, can be minimized. In particular, the advantages of such a solution become apparent in the case of a hydraulic system utilizing a harvester head 25 of a harvester, whereby the power demands vary a great deal, particularly when the feeding function 7 and the sawing function 8 alternate in trunk handling.

The present method for controlling a power source can be used to control power sources other than the primary power source 1 of a forestry machine. FIG. 3 thus shows a solution in which power generated by the primary power source of a forestry machine is stored at least partly in, for instance, a set of accumulators or other energy-storing means 9. If required, the power can be taken into use from the storing means in the form of electric or other kind of power transmission, whereby the control steps are directed at this power source 10 that thus forms a secondary power source.

Analogically, pressure accumulators or the like solutions known as such for storing hydraulic energy can be considered instead of storing electric energy. Thus, instead of a generator arrangement 11 and a control means 12 controlling it, for example a hydraulic pump should be attached to the primary power source in a manner known as such. In such an embodiment, the pressure accumulator itself could function as a secondary power source, whereby the control of the secondary power source could be considered to encompass the control of the flow and pressure of the pressure medium discharging from the pressure accumulator.

The present method can be applied to controlling this secondary power source in also such a case where the energy-storing means essentially belonging to the above arrangement could generate powers greater than those generated by the primary power source of the forestry machine. In the exemplary case presented above, electric energy charged in the set of accumulators 9, for instance, is used in an electric engine 13 for running a hydraulic pump 14, for instance, the electric motor constituting in this case the secondary power source 10. Thus, the rotative speed of this electric engine, for example, can be momentarily or for a longer time controlled to be higher to achieve greater power production availability.

On the other hand, with an electric system an analogic arrangement can be implemented hydraulically. In such a case, the primary power source 1 of the forestry machine would utilize a large hydraulic pump 14 pressurizing and filling a pressure accumulator, whereby the secondary power source 10 would be a hydraulic engine that would take the pressurized medium into use from this pressure accumulator. A hydraulic engine could also in this case be controlled to predict variations in the power demand. On the other hand, in the case of hydraulic implementation, the pressure accumulator itself could function as said secondary power source, whereby the control of the secondary power source could be considered to encompass the control of the flow and pressure of the pressure medium discharging from the pressure accumulator.

It is to be understood that the above description and the associated figures are only intended to illustrate the present solution. The solution is thus not restricted only to the embodiment presented above or defined in the claims, but many different variations and modifications possible within the idea defined in the attached claims will be obvious to those skilled in the art.

The invention claimed is:

1. A method for controlling a power source of a forestry machine, in which the power source utilizes directly or indirectly at least one of a work device and a handling device positioned in the forestry machine, said method comprising:
   using a controller to control said at least one of said work device and said handling device;
   the controller giving a control command affecting a state of a function to said at least one of said work device and said handling device;
   transmitting said control command to the power source as a secondary control command, said secondary control command providing an operational change in the power source; and
   executing the operational change before operation of said at least one of said work device and said handling device so in such a way that the secondary control command at least momentarily affects at least one control parameter of the power source, predicting a future load of the power source.

2. The method according to claim 1, wherein transmitting the control command to said at least one of said work device and said handling device is momentarily delayed.

3. The method according to claim 1, further comprising increasing a power of the power source so that the secondary control command affects said at least one control parameter of the power source, predicting the future load of the power source.

4. The method according to claim 1, wherein said at least one control parameter comprises a plurality of control parameters of the power source that are affected by taking into account the operational change of several work devices or handling devices operating simultaneously.

5. The method according to claim 1, wherein said at least one control parameter comprises a plurality of control parameters of the power source that are affected by said control command received substantially simultaneously with said secondary control command by said at least one of said work device and said handling device of the forestry machine.

6. The A method according to claim 1, wherein said handling device comprises one or more harvester heads and wherein said at least one control parameter comprises a plurality of control parameters of the power source that are affected by a control command activating the operation of said one or more harvester heads.

7. The method according to claim 1, wherein a change in said at least one control parameter takes place only when the load level of the power source exceeds a preset limit value.

8. The method according to claim 1, wherein control parameters of the power source are affected by said control command activating at least one function of a boom system of the forestry machine.

9. The method according to claim 1, wherein the power source comprises a primary power source of the forestry machine.

10. The method according to claim 1, wherein the power source comprises a non-primary power source of the forestry machine.

11. The method according to claim 1, further comprising adjusting a duration of the operational change of the control parameters of the power source.

* * * * *